United States Patent [19]

Pienta

[11] Patent Number: 5,177,875
[45] Date of Patent: Jan. 12, 1993

[54] MEASURING MACHINE

[75] Inventor: David J. Pienta, Temperance, Mich.

[73] Assignee: Automatic Handling, Inc., Erie, Mich.

[21] Appl. No.: 569,567

[22] Filed: Aug. 20, 1990

[51] Int. Cl.⁵ .............................................. G01B 5/00
[52] U.S. Cl. ..................................... 33/803; 33/805; 33/1 M; 33/783; 53/249
[58] Field of Search .................. 33/803, 805, 783, 793, 33/792, 573, 549, 657, 655, 784, 785, 791, 503, 1 M; 53/249; 83/155.1

[56] References Cited

U.S. PATENT DOCUMENTS

| | | | |
|---|---|---|---|
| 1,281,740 | 10/1918 | Yingling | 33/805 |
| 1,539,896 | 6/1925 | Claybourn | 33/805 |
| 1,669,559 | 5/1928 | Henley et al. | 33/805 |
| 1,823,999 | 9/1931 | Vine | 33/805 |
| 2,814,120 | 11/1957 | Fogiel | 33/803 |
| 2,831,254 | 4/1958 | Phillips et al. | 33/805 |
| 2,968,100 | 1/1961 | Etchell | 33/803 |
| 3,226,833 | 1/1966 | Lemelson | 33/783 |
| 4,736,567 | 4/1988 | Pienta . | |
| 4,852,267 | 8/1989 | Tezuka | 33/503 |
| 4,910,446 | 3/1990 | McMurtry et al. | 33/1 M |

FOREIGN PATENT DOCUMENTS

| | | | |
|---|---|---|---|
| 448759 | 5/1948 | Canada | 33/803 |
| 564386 | 9/1944 | United Kingdom | 33/803 |

Primary Examiner—William A. Cuchlinski, Jr.
Assistant Examiner—C. W. Fulton
Attorney, Agent, or Firm—Emch, Schaffer, Schaub & Porcello Co.

[57] ABSTRACT

A measuring machine for measuring an article is disclosed. The machine includes a frame which mounts a movable carriage. A vertically movable measuring assembly is mounted on the carriage. The measuring assembly includes a pair of spaced measuring arms. A drive cylinder moves the measuring arms to engage the article. A linear scale is mounted adjacent the measuring arms.

7 Claims, 7 Drawing Sheets

MEASURING MACHINE

BACKGROUND OF THE INVENTION

The present measuring machine is used to measure articles. In the particular application described, the measuring machine is used to measure a roll, for example a paper roll, prior to moving to another station in an automated roll wrapping operation. The measuring machine may be used prior to a wrapping machine operation as disclosed in U.S. Pat. No. 4,736,567. However, the present measuring machine is not limited to the measurement of rolls but may be used to measure various types of articles. Furthermore, while it is stated in the following specification that the machine measures the length of an article, the word "length" is used in a broad sense and includes measurements of the widths and diameters of various articles.

The measurement of the length of a paper roll is important so that the subsequent wrapping operations are coordinated both for correctness of the wrap and also for efficiency in the use of wrapping materials.

The measuring machine, according to the present invention, has as its primary object to provide for the efficient, automatic and proper measuring of an article.

SUMMARY OF THE INVENTION

The measuring machine, according to the present invention, is suitable for measuring an article, for example for measuring the length of a paper roll. The measuring machine includes a frame having elevated guide members. A carriage is mounted for movement along the guide members. A vertically movable measuring assembly is mounted on the carriage means. The measuring assembly includes a spaced pair of measuring arms which are movable relative to one another. Drive means are provided for moving the arms and an incremental linear scale is positioned adjacent the measuring arms.

In operation, an article, for example a paper roll, is moved into position beneath the measuring machine where it is stopped. The carriage is moved over the roll and the measuring assembly moved vertically downwardly until the spaced measuring arms are adjacent the opposite ends of the roll. The drive means move the arms against the ends of the roll with the length being sensed by an incremental linear scale. This information is then recorded or forwarded to a subsequent operation, for example a wrapping operation.

DESCRIPTION OF THE PREFERRED EMBODIMENT

Figure 1:
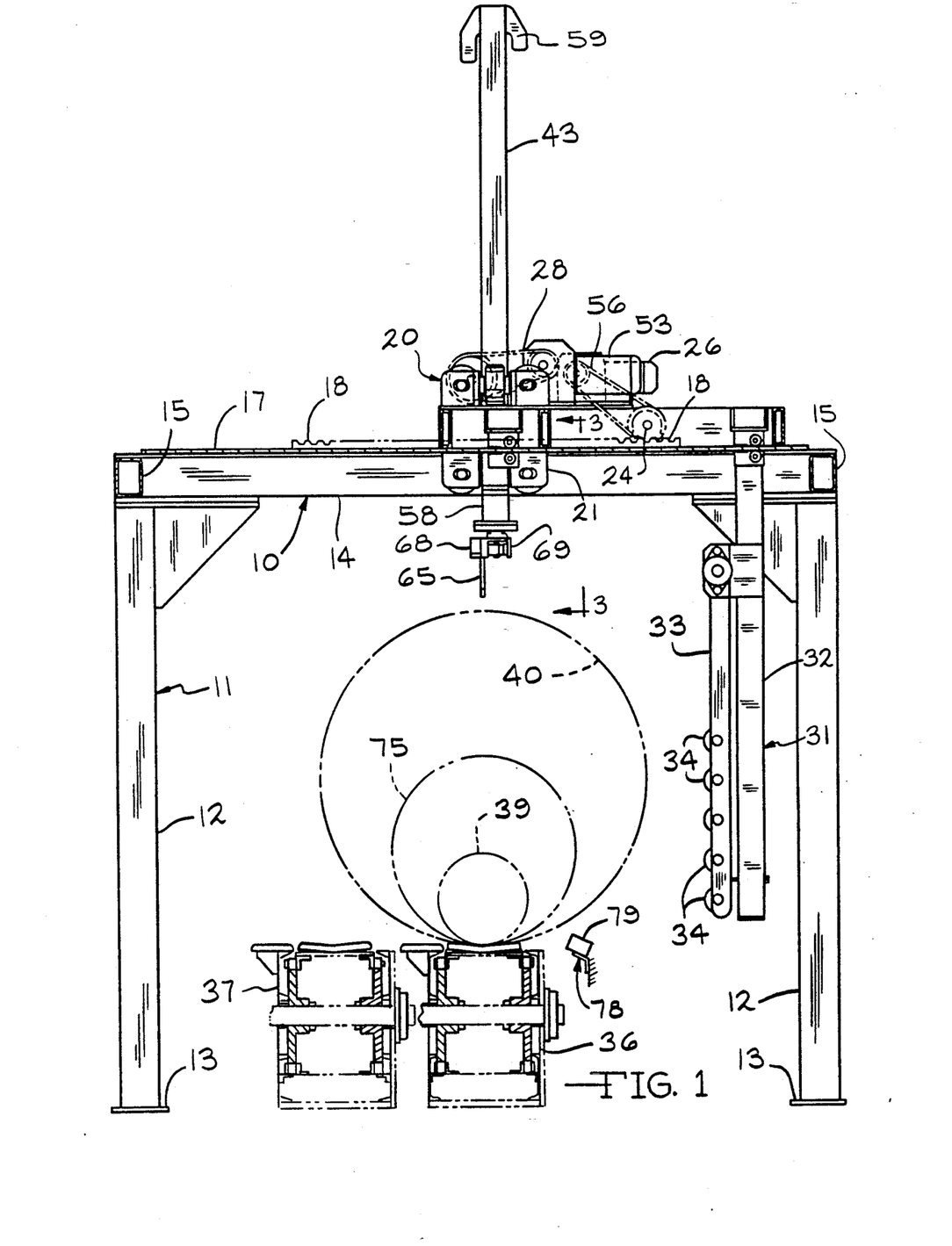
FIG. 1 is an elevational view of a measuring machine, according to the present invention, with a portion of the machine shown in cross-section.
Figure 2:
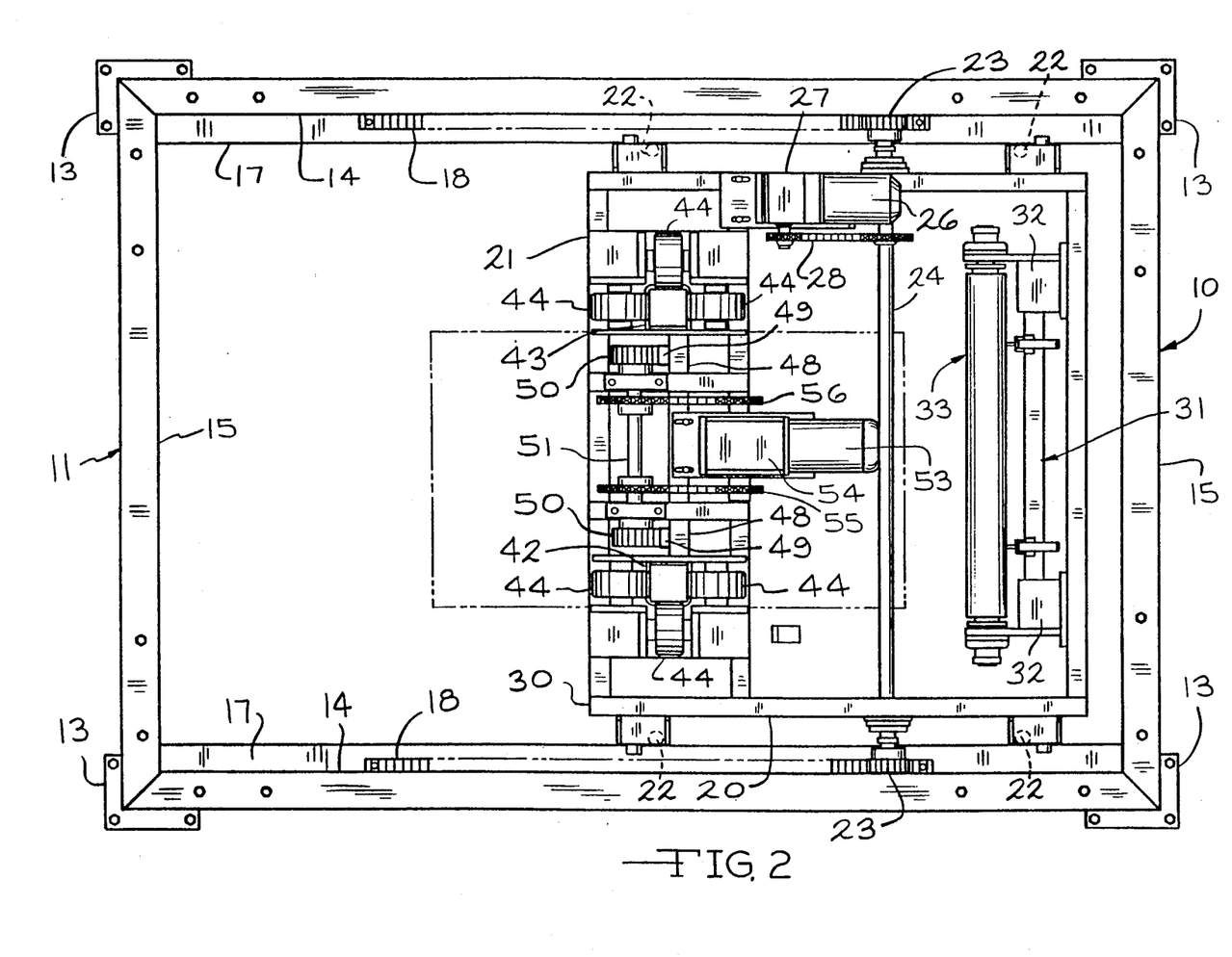
FIG. 2 is a top plan view of the measuring machine shown in FIG. 1.

A measuring machine according to the present invention is generally indicated by the reference number 10. Referring to FIGS. 1 and 2, the measuring machine 10 includes a frame 11 having vertical legs 12 extending upwardly from base members 13. A pair of spaced elevated guide members 14 are positioned on the upper ends of the legs 12 and are connected together by end members 15. Horizontal plates 17 are positioned along the spaced elevated guide members 14 and mount spaced horizontal racks 18. A carriage assembly 20, including a carriage 21, is supported by and movable along the spaced elevated guide members 14. A plurality of bearing roller assemblies 22 are positioned on the spaced elevated guide members 14 of the frame 11 and both support and guide the carriage assembly 20 as it moves. Drive gears 23 are mounted on the ends of a shaft 24 which is carried by the carriage assembly 20. The drive gears 23 mate with the spaced horizontal racks 18. A drive motor 26 operating through a gear box 27 drives a chain 28, which rotates the shaft 24. The drive motor 26 is capable of moving the carriage assembly 20 horizontally along the spaced guide members 14 by rotating the drive gears 23.

The carriage assembly 20 includes a box frame 30 which mounts the drive motor 26 and also supports the shaft 24. A pusher assembly 31 is mounted at one end of the box frame 30. The pusher assembly 31 includes a pair of vertically spaced struts 32 which are mounted to the box frame 30. The struts 32 mount a roller assembly 33 which includes a plurality of horizontal and vertically spaced rollers 34.

Referring to FIG. 1, a first conveyor 36 is shown. A second conveyor 37 is positioned adjacent the first conveyor 36. A small paper roll 39, is indicated in FIG. 1 by dash lines and generally represents the smallest size paper roll to be positioned on the first conveyor 36. Similarly, a large paper roll 40 is indicated in dash lines and generally represents the largest paper roll which is positioned on the first conveyor 36.

If, for example, the large paper roll 40 is positioned on the first conveyor 36 is a measuring position, after the measurement is completed, the drive motor 26 is energized and the pusher assembly 31 is moved to the left as shown in FIG. 1. The rollers 34 of the pusher assembly 31 engage the periphery of the paper roll 40 and move the paper roll to a position on the second conveyor 37 where it is then moved to a subsequent operation, for example, a wrapping operation.

Figure 3:
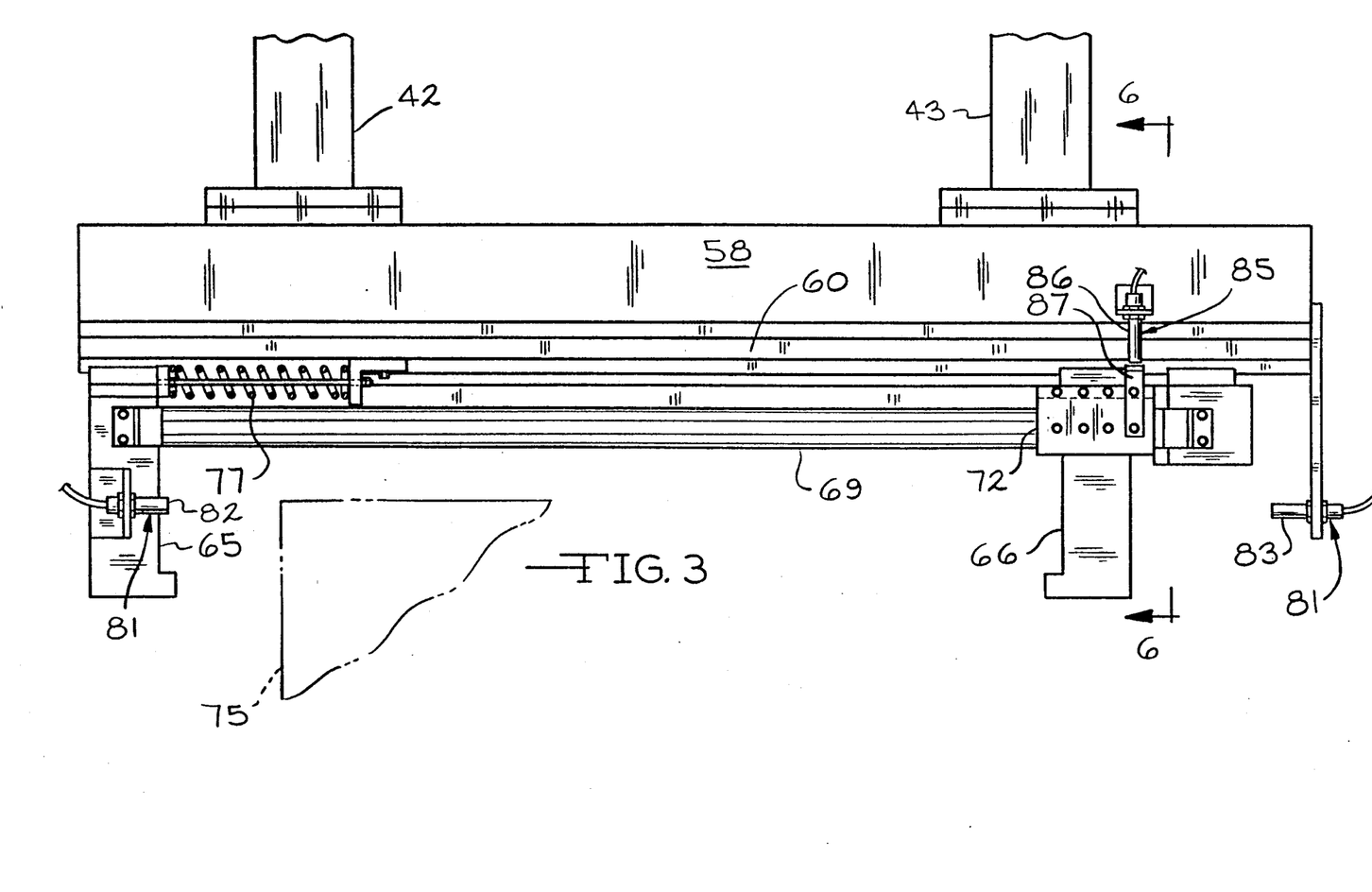
FIG. 3 is a fragmentary side elevational view taken along the line 3—3 of FIG. 1.
Figure 4:
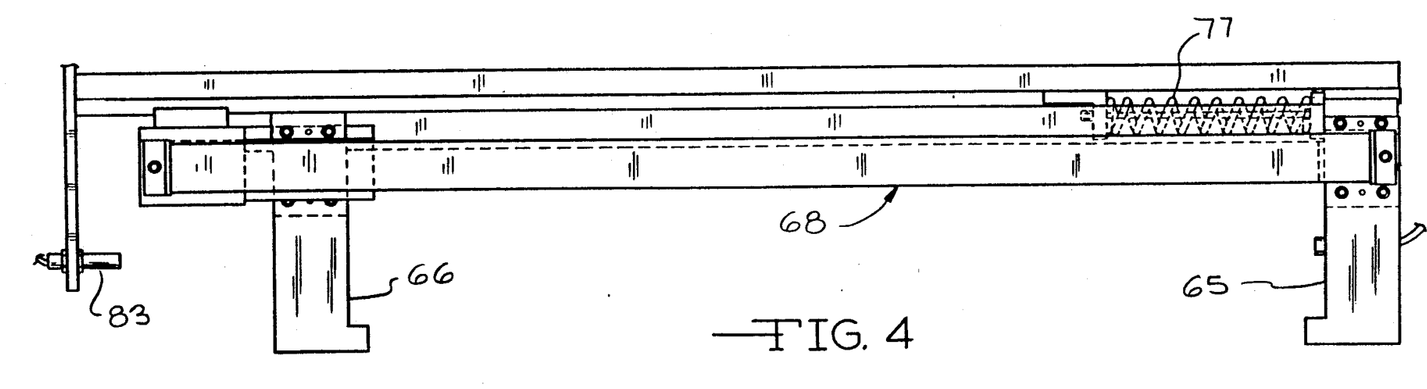
FIG. 4 is a side elevational view of the measuring assembly, taken on the side opposite to FIG. 3.
Figure 5:
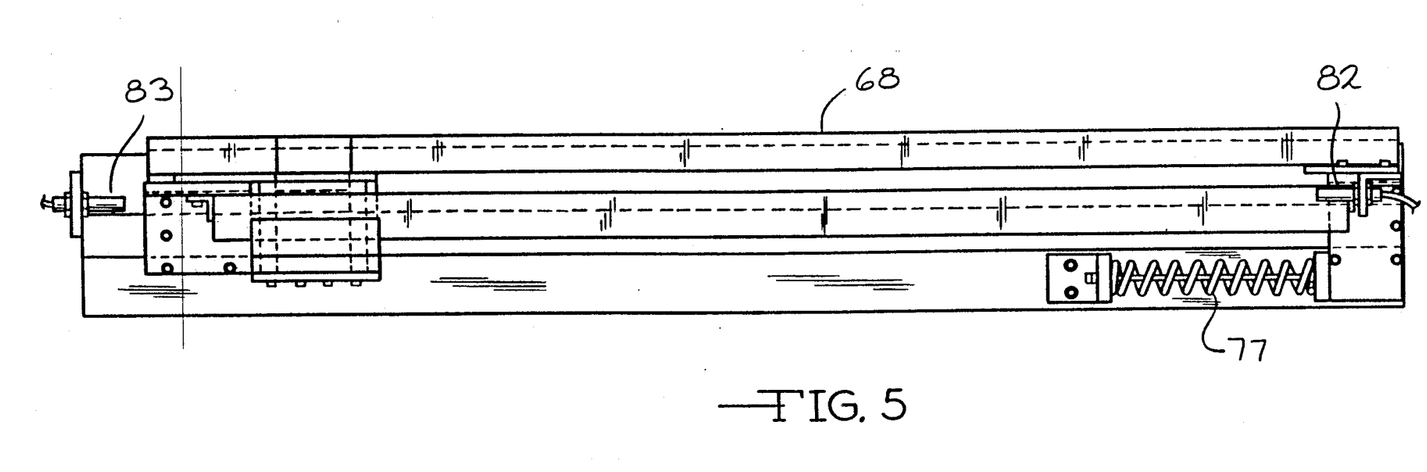
FIG. 5 is a bottom view of the assembly shown in FIGS. 3 and 4.
Figure 6:
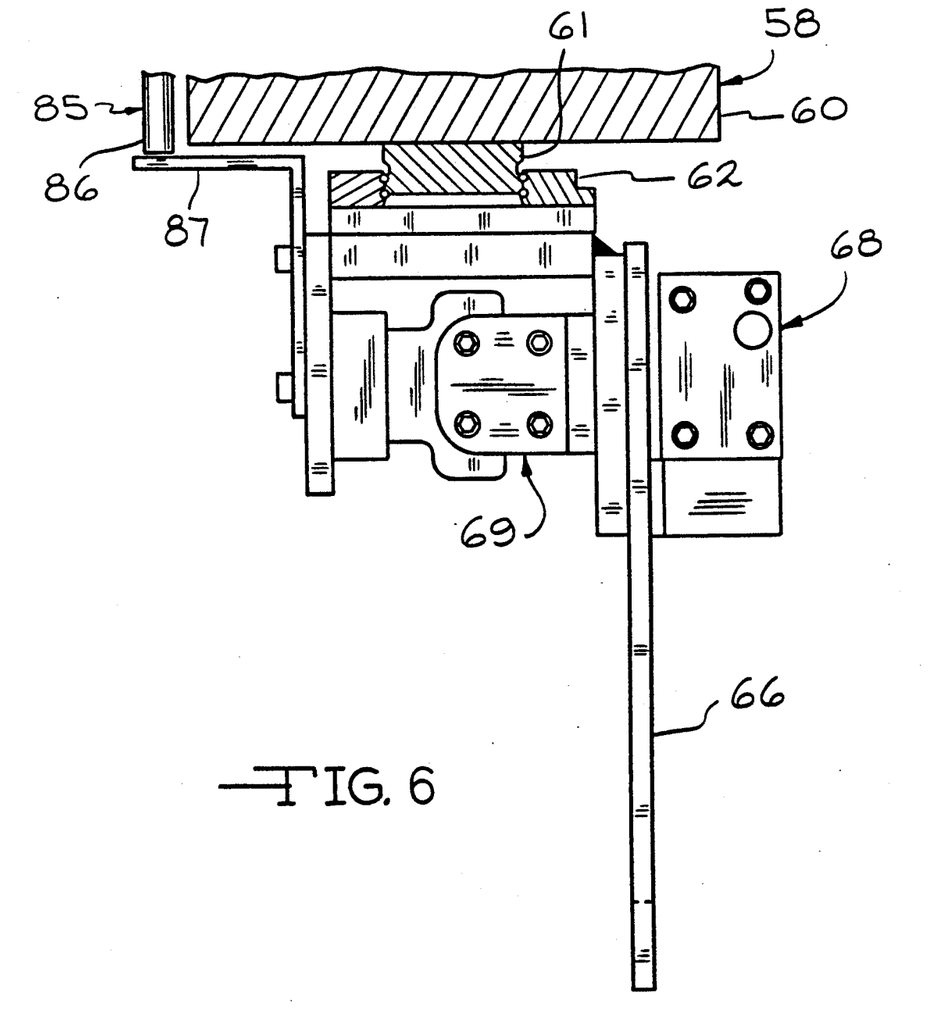
FIG. 6 is an enlarged fragmentary sectional view taken along the line 6—6 of FIG. 3.

The carriage assembly 20 also includes a pair of spaced vertical posts 42 and 43. Referring to FIGS. 1 and 2, the vertical posts 42 and 43 are vertically movable and are mounted in roller assemblies 44. Each of the roller assemblies 44 include upper rollers and lower rollers which accurately guide the vertical posts 42 and 43 and also maintain the posts 42 and 43 in a correct vertical alignment. Three roller assemblies 44 are positioned on three sides of each vertical posts 42 and 43. On the fourth side, a plate 48 extends inwardly from the respective posts 42 and 43. Each plate 48 mounts a vertical rack 49 which mates with a respective drive gear 50. The drive gears 50 are mounted on a drive shaft 51. A motor 53 having a gear box 54 drives a pair of drive chains 55 and 56 which in turn drive the shaft 51 and the drive gears 50. Rotation of the drive gears 50 in unison move the vertical posts 42 and 43 along a predetermined vertical path. Referring to FIG. 3, the bottom ends of the vertical posts 42 and 43 are mounted on and connected together by a horizontal beam assembly 58. A stop assembly 59 is positioned at the upper end of the respective vertical posts 42 and 43.

Figure 9:
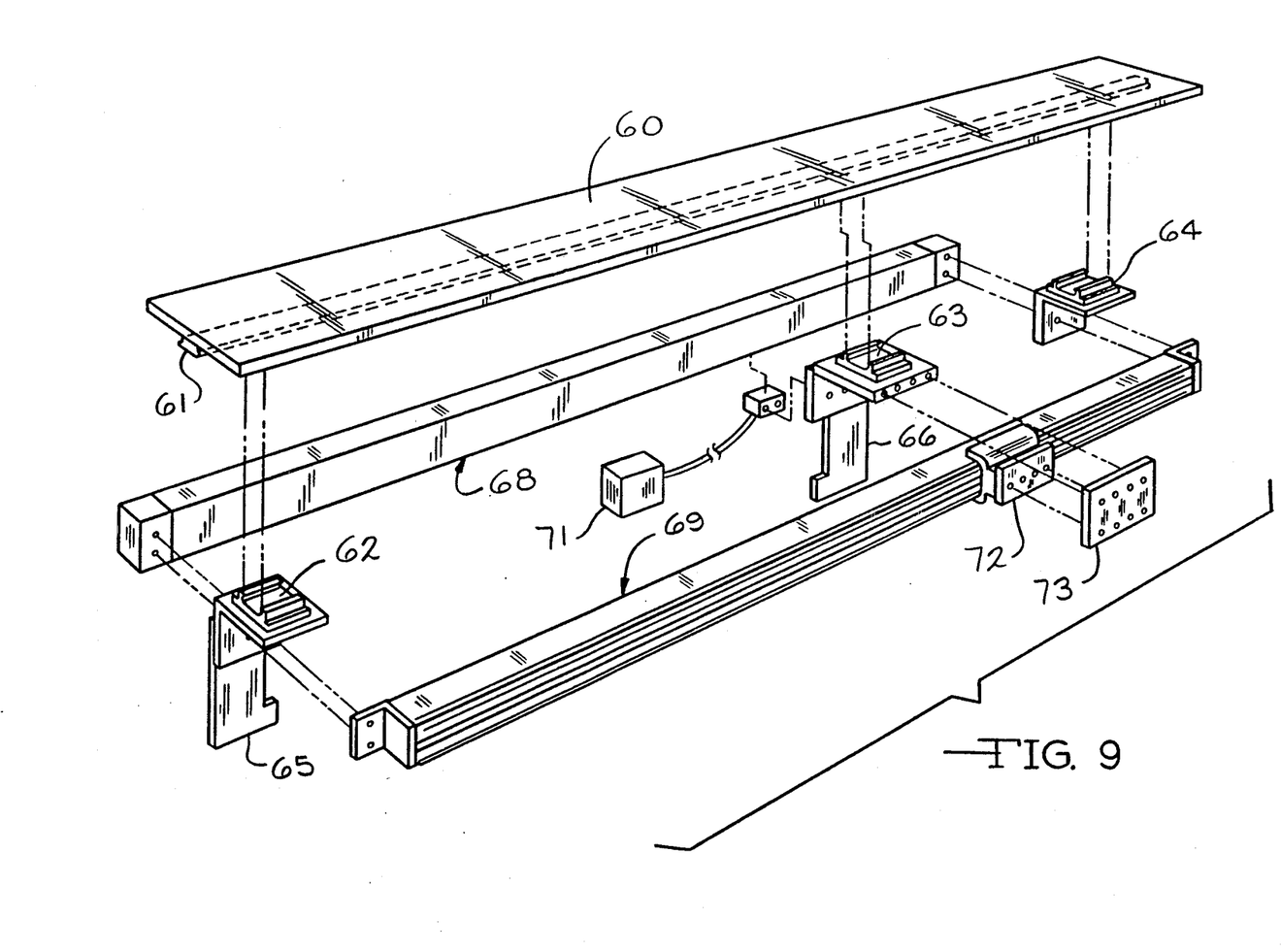
FIG. 9 is an exploded view of the measuring assembly.

Referring to FIG. 3 and FIG. 9, the horizontal beam assembly 58 includes a bottom plate 60 which has a shaped guide member 61 on its lower surface. The guide member 61 extends the entire length of the horizontal beam assembly 58 and mounts complementary bearings 62, 63 and 64. The movable guide bearing 62 mounts a first measuring arm 65 while the movable guide bearing 63 mounts a second measuring arm 66. The measuring arms 65 and 66 are movable toward and away from one another. The last guide bearing 64 stays in a fixed position. A longitudinally extending scale assembly 68 is positioned adjacent one side of the guide bearings 62-64. A cylinder assembly 69 is mounted on the other side of the guide bearings 62-64. The scale assembly 68 may be a prior art assembly manufactured by Heidenhain Corporation. The scale assembly 68 includes a very accurate linear scale which transmits the scale reading to a remote microprocessor indicated in FIG. 9 by the reference number 71. The microprocessor 71 records the measured information and also transmits the information to a subsequent operation if required.

Figure 7:
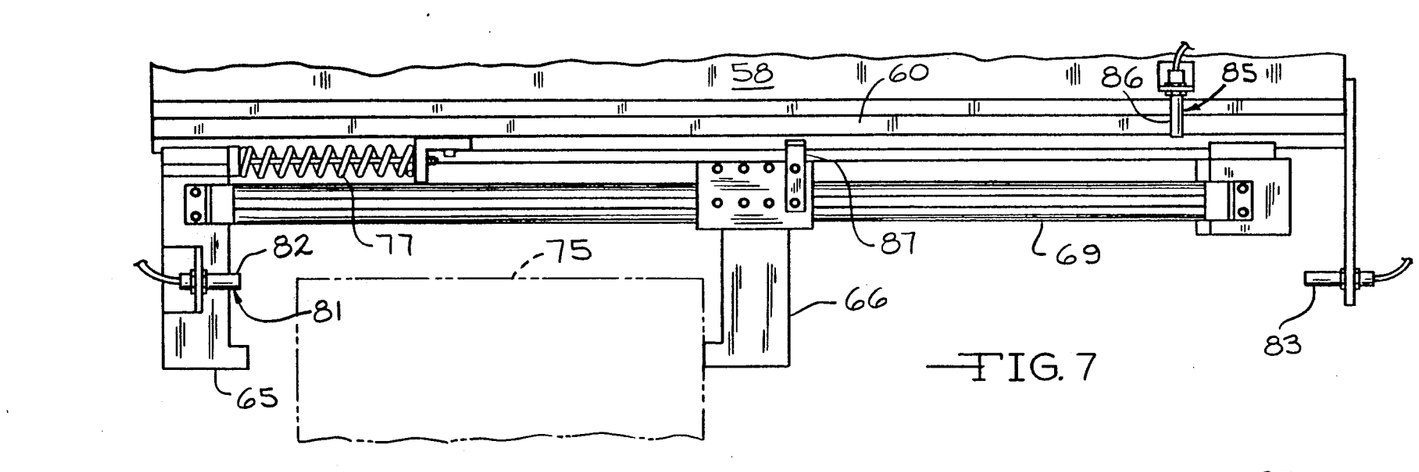
FIG. 7 is a view similar to FIG. 3 showing the measuring assembly in another progressive position.
Figure 8:
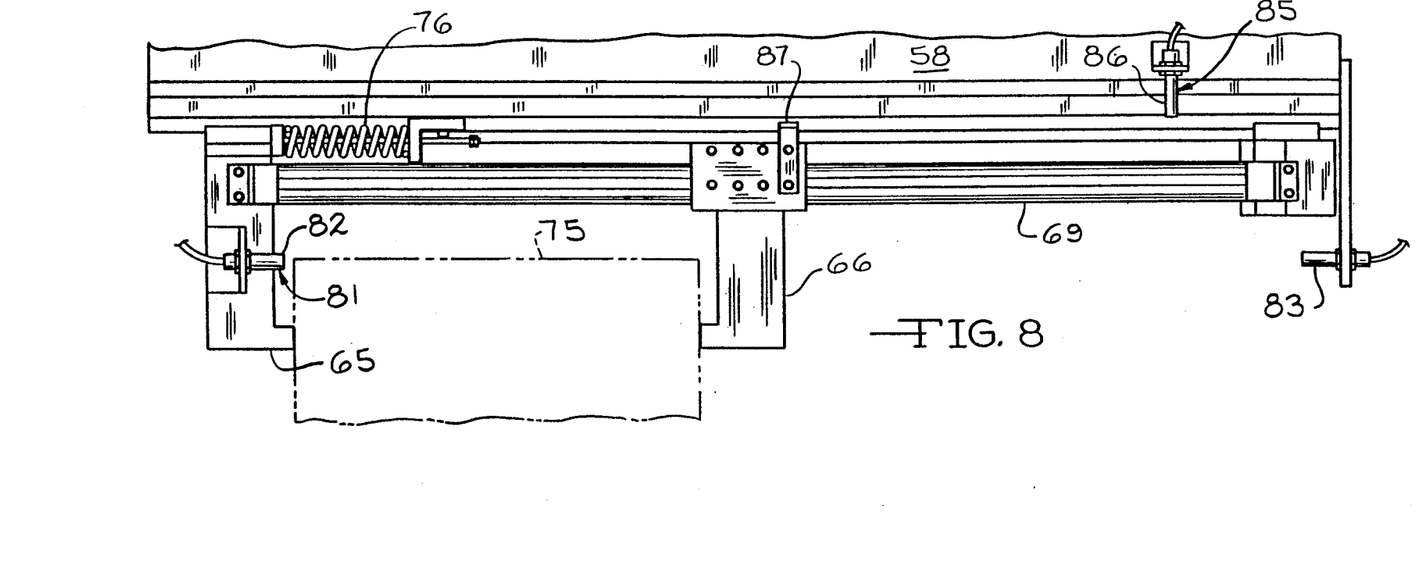
FIG. 8 is a view similar to FIG. 3 and FIG. 7 showing the measuring assembly in still a further progressive position.

The cylinder assembly 69 may be a standard pneumatic or hydraulic cylinder. Preferably, the pneumatic cylinder assembly 69 is a rodless band-type cylinder manufactured by Origa Corporation. Referring to FIG. 9, the piston of the cylinder assembly 69 is attached to a movable carrier bracket 72 which is connected through a plate 73 to the second measuring arm 66. Movement of the carrier bracket 72 by the piston moves the second measuring arm 66 along the guide member 61 of the horizontal beam assembly 58. Referring to FIGS. 7 and 8, after the second measuring arm 66 is moved into position against a paper roll 75, continued force generated by the piston of the cylinder assembly 69 overcomes the spring force of a spring 76 and moves the first measuring arm 65 against the other end of the paper roll 75 so that a correct reading is obtained by the scale assembly 68 and transmitted to the microprocessor 71. At the completion of the measuring cycle, the cylinder assembly 69 returns the second measuring arm 66 to its FIG. 3 position and the spring 77 returns the first measuring arm 65 to its FIG. 3 position.

Referring to FIG. 1, a sensor assembly 78 including a beam emitter 79 is operatively connected to the drive mechanism for the first conveyor 36. When an article or roll, for example the paper roll 75, reaches a point where its presence is sensed by the assembly 78, the conveyor 36 is stopped so that the measuring operation may be performed.

Referring to FIG. 3, a second sensor assembly 81 is shown. The second sensor assembly 81 includes a transmitter unit 82 and a receiver unit 83. While other types of sensor apparatus may be used, in the present embodiment, the second sensor assembly 81 transmits light through the transmitter 82 to the receiver 83. When the vertical posts 42 and 43 move downwardly, the downward movement continues until the light beam of the second sensor assembly 81 is broken. The second sensor assembly 81 is operatively connected to the drive motor 53.

Still referring to FIG. 3, a proximity switch assembly 85 is also included in the circuit to the drive motor 53. The proximity switch assembly 85 includes a magnetic proximity switch 86 and a switch arm 87 which is operatively connected and travels with the carrier bracket 72. Before the motor 53 can be operated to move the vertical posts 42 and 43 along their vertical paths, the proximity switch assembly 85 must be in the home position, shown in FIG. 3. This insures that the measuring arms 65 and 66 are correctly spaced apart during their vertical travel.

In a typical measuring operation, an article, for example the paper roll 75, moves along the first conveyor 36 until its presence is sensed by the sensor assembly 78 and the first conveyor 36 stopped. The drive motor 26 is energized and the carriage assembly 20 is moved horizontally along the spaced guide members 14 until it is in the position shown in FIG. 1 where the vertical posts 42 and 43 fall generally along the longitudinal centerline of the roll 75. At this time, the drive motor 53 is energized and the vertical posts 42 and 43 are moved vertically downwardly until the second sensor assembly 81 senses the presence of the roll 75 and downward travel is stopped. The measuring machine 10 is now generally in the position shown in FIG. 3 with the first and second measuring arms 65 and 66 being positioned on opposite ends of the roll 75.

The cylinder assembly 69 is energized and the carrier bracket 72 moved to the left as shown in FIG. 3 until the second measuring arm 66 engages the end of the roll 75, as shown in FIG. 7. Continued operation of the cylinder assembly 69 moves the first measuring arm 65 to the right until it engages the other end of the roll 75 as shown in FIG. 8. At this time, the measurement is made by the scale assembly 68 and transmitted to the microprocessor 71. The first and second measuring arms 65 and 66 are then returned to their home positions, shown in FIG. 3. The motor 53 is energized and the vertical posts 42 and 43 moved upwardly to the FIG. 1 position.

At this time, the drive motor 26 is again energized and the carriage assembly 20 including the roller assembly 33 moves to the left as shown in FIG. 1. The rollers 74 engage the roll 75 and move the roll to the second conveyor 37 which then automatically moves the roll 75 to a subsequent station, for example to a wrapping station.

Many revisions may be made to the preferred embodiment without departing from the scope of the following claims.

I claim:

1. A measuring machine for measuring an article comprising, in combination, a frame, a pair of horizontal spaced guide members, carriage means for movement along said guide members, first drive means for moving said carriage means, pusher means operatively connected to said carriage means for moving the article, a measuring assembly mounted on said carriage means, said measuring assembly including at least one vertically movable post, said post operatively mounting a spaced pair of measuring arms, each of said spaced pair of measuring arms being movable toward and away from one another, second drive means for moving said measuring arms relative to one another, and third drive means for vertically moving said measuring assembly.

2. A measuring machine, according to claim 1, wherein said measuring assembly includes a pair of spaced vertically moving posts and a horizontal beam assembly mounted adjacent the lower ends of said posts.

3. A measuring machine, according to claim 2, including a linear scale mounted on said beam assembly, wherein such measuring arms engage an article and indicate the length of said article on such linear scale.

4. A measuring machine, according to claim 2, wherein said second drive means is mounted on said beam assembly.

5. A measuring machine, according to claim 4, wherein said second drive means comprises a rodless band-type cylinder.

6. A measuring machine, according to claim 1, wherein said third drive means includes a vertical rack operatively mounted on said post, a drive gear mating with said rack and a drive motor operatively connected to said drive gear, whereby rotation of said drive gears moves said rack and said post vertically.

7. A measuring machine for measuring an article comprising, in combination, a frame, a pair of horizontal spaced guide members, carriage means for movement along said guide members, first drive means for moving said carriage means, pusher means operatively connected to said carriage means for moving the article, a measuring assembly mounted on said carriage means, said measuring assembly including a pair of spaced vertically moving posts and a horizontal beam assembly mounted adjacent the lower ends of said posts, said posts operatively mounting a spaced pair of measuring arms, each of said spaced pair of measuring arms being movable toward and away from one another, second drive means for moving said measuring arms relative to one another, and third drive means for vertically moving said measuring assembly.

* * * * *